J. Terrell,
Artificial Teeth.
N° 43,347.    Patented June 28, 1864.

Witnesses:
C. E. Foster
C. H. Cowdon

Inventor:
Henry Howson
Atty. for J. Terrell

UNITED STATES PATENT OFFICE.

JOHN TERRELL, OF PHILADELPHIA, PENNSYLVANIA.

IMPROVEMENT IN ARTIFICIAL TEETH.

Specification forming part of Letters Patent No. 43,347, dated June 28, 1864.

*To all whom it may concern:*

Be it known that I, JOHN TERRELL, of Philadelphia, Pennsylvania, have invented certain Improvements in Artificial Teeth; and I do hereby declare the following to be a full, clear, and exact description of the same, reference being had to the accompanying drawings, and to the letters of reference marked thereon.

My invention relates to that class of teeth which are intended to be used in connection with vulcanizable gum bases; and it consists in certain openings formed and arranged in respect to the teeth, and in projections at the sides of the latter, so that they can be firmly secured to each other and to the vulcanizable gum base.

In order to enable others skilled in the art to make and use my invention, I will now proceed to describe its construction and operation.

Figure 1:
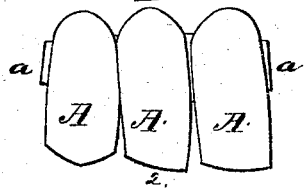
Figure 2:
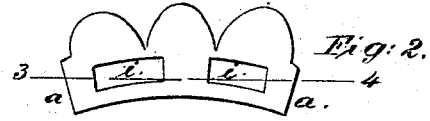
Figure 3:
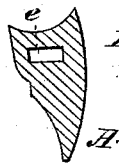
Figure 4:
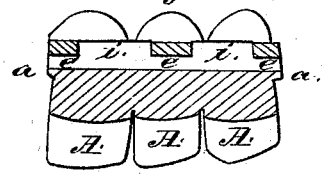
Figure 5:
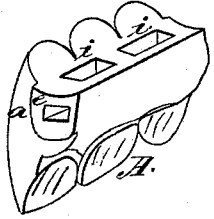

On reference to the accompanying drawings, which form a part of this specification, Figure 1 represents a block of three teeth, constructed according to my improvements; Fig. 2, an inverted plan view of Fig. 1; Fig. 3, a section on the line 1 2, Fig. 1; Fig. 4, a vertical section on the line 3 4, Fig. 2; and Fig. 5, a perspective view.

Similar letters refer to similar parts throughout the several views.

A A A represent three teeth, which together form what is technically termed a "block," at each end of which is a projection, *a*, for a purpose described hereinafter. Through the block, from one end to the other, extends an opening, *e*, and in the base are two oblong openings, *i i*, which communicate with the opening *e*.

Blocks, as well as single teeth, heretofore made to be used with vulcanizable gum bases have been provided with pins and projections, or have had dovetailed openings in the same, in order that the gum which surrounds the pins or penetrates the openings may thus acquire such a hold upon the teeth as will prevent the latter from being detached. The use of pins for this purpose is objectionable, both on account of the expense of the platina, of which the pins are made, and the inadequate surface which they present to the gum. The dovetailed openings are also objectionable on account of the risk incurred of breaking the teeth in cutting the openings.

Sets of teeth mounted on vulcanizable gum bases have been much objected to by many on account of the exposure of the gum at the point where two blocks are joined together, this exposure causing the work to present an unsightly and unnatural appearance in the mouth.

It will be seen that openings of the character represented in the drawings may readily be formed, both in blocks and single teeth, without danger of breaking the same, by the use of the mold for which Letters Patent were granted to me on the 10th day of November, 1863, and that the blocks may be so placed that the opening *e* in one shall coincide with that in the block next to it, so that the introduction of the vulcanizable gum which forms the base through the openings *i* into the openings *e* will, when the gum hardens, secure the blocks firmly to each other and to the base. It will also be seen that the projections *a* on the ends of the blocks may be so fitted to each other that the gum can pass through the opening *e* in one block to that in the other without being in the least exposed, the natural appearance of the teeth being thus maintained.

It will be apparent that but one opening, *i*, may be used when found necessary, and that although I have represented and described my improvements as applied to blocks they are equally applicable to single teeth.

I claim as my invention and desire to secure by Letters Patent—

1. The openings *e* and *i*, formed and arranged in respect to a tooth or a block of teeth substantially as and for the purpose specified.

2. The projections *a*, arranged as described, for the purpose set forth.

In testimony whereof I have signed my name to this specification in the presence of two subscribing witnesses.

JOHN TERRELL.

Witnesses:
CHARLES E. FOSTER,
JOHN WHITE.